(12) United States Patent
Chen

(10) Patent No.: US 10,502,883 B2
(45) Date of Patent: Dec. 10, 2019

(54) BACKLIGHT MODULE AND DISPLAY APPARATUS THEREOF

(71) Applicants: HKC Corporation Limited, Shenzhen, Guangdong (CN); Chongqing HKC Optoelectronics Technology Co., Ltd., Chongqing (CN)

(72) Inventor: Yu-Jen Chen, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 38 days.

(21) Appl. No.: 15/735,315

(22) PCT Filed: Apr. 14, 2017

(86) PCT No.: PCT/CN2017/080553
§ 371 (c)(1),
(2) Date: Dec. 11, 2017

(87) PCT Pub. No.: WO2018/120508
PCT Pub. Date: Jul. 5, 2018

(65) Prior Publication Data
US 2019/0011627 A1    Jan. 10, 2019

(30) Foreign Application Priority Data
Dec. 27, 2016    (CN) .......................... 2016 1 1228277

(51) Int. Cl.
*F21V 8/00*    (2006.01)
*G02F 1/1335*    (2006.01)

(52) U.S. Cl.
CPC .......... *G02B 6/0028* (2013.01); *G02B 6/001* (2013.01); *G02B 6/0031* (2013.01); *G02F 1/133524* (2013.01); *G02F 1/133615* (2013.01)

(58) Field of Classification Search
CPC .... G02B 6/001; G02B 6/0028; G02B 6/0031; G02F 1/1336
See application file for complete search history.

(56) References Cited

U.S. PATENT DOCUMENTS 3,043,910 A * 7/1962 Hicks, Jr. ................. G02B 6/08
                                                        264/1.26
4,208,363 A * 6/1980 Yevick ............. B29D 11/00278
                                                        264/1.24

(Continued)

FOREIGN PATENT DOCUMENTS

CN      101216632 A     7/2008
CN      101303476 A     11/2008

(Continued)

*Primary Examiner* — Robert J May
*Assistant Examiner* — Leah Simone Macchiarolo
(74) *Attorney, Agent, or Firm* — Muncy, Geissler, Olds & Lowe, P.C.

(57) ABSTRACT

The present disclosure is related to a backlight module and a display apparatus thereof. The display apparatus comprises a display panel and a backlight module. The backlight module comprises a light guide plate having a light incident side, a plurality of optical fiber bundles disposed at an edge of the light incident side of the light guide plate. Each of the optical fiber bundles comprises a light-guiding section and a light-outputting section, and a plurality of light-outputting sections of the plurality of optical fiber bundles are arranged at the light incident side of the light guide plate.

7 Claims, 7 Drawing Sheets

(56) References Cited

U.S. PATENT DOCUMENTS

| | | | | | |
|---|---|---|---|---|---|
| 4,978,952 | A | * | 12/1990 | Irwin | G09G 3/02 |
| | | | | | 345/102 |
| 5,053,765 | A | * | 10/1991 | Sonehara | G02B 6/06 |
| | | | | | 340/815.43 |
| 5,432,876 | A | * | 7/1995 | Appeldorn | G02B 6/001 |
| | | | | | 362/554 |
| 5,719,649 | A | | 2/1998 | Shono et al. | |
| 7,369,725 | B2 | * | 5/2008 | Takatori | G02B 6/001 |
| | | | | | 349/62 |
| 8,860,910 | B2 | * | 10/2014 | Chen | G02B 6/4298 |
| | | | | | 349/65 |
| 2001/0050667 | A1 | | 12/2001 | Kim et al. | |
| 2002/0176035 | A1 | * | 11/2002 | Yamazaki | G02B 6/0008 |
| | | | | | 349/61 |
| 2007/0086712 | A1 | * | 4/2007 | Shani | G02B 6/0028 |
| | | | | | 385/101 |
| 2008/0112677 | A1 | * | 5/2008 | Smith | G02B 6/06 |
| | | | | | 385/119 |
| 2014/0146268 | A1 | * | 5/2014 | Li | G02B 6/04 |
| | | | | | 349/58 |
| 2018/0024286 | A1 | * | 1/2018 | Schubert | G02B 6/0006 |
| | | | | | 362/553 |
| 2018/0156960 | A1 | * | 6/2018 | Tseng | G02B 6/0028 |

FOREIGN PATENT DOCUMENTS

| | | |
|---|---|---|
| CN | 203337958 U | 12/2013 |
| CN | 104676387 A | 6/2015 |
| CN | 106054456 A | 10/2016 |
| CN | 106526969 A | 3/2017 |

\* cited by examiner

BACKLIGHT MODULE AND DISPLAY APPARATUS THEREOF

FIELD OF THE INVENTION

The present invention relates to a backlight module and a display apparatus, and more particularly to a backlight module and a display apparatus using optical fiber bundle as a light source.

BACKGROUND OF THE INVENTION

In recent years, accompanying advances in technology there are many different display apparatuses such as Liquid Crystal Display (LCD) or Electro Luminenscence (EL) widely applied in panel displays. Take a liquid crystal display as an example, most of the LCDs are backlighting LCDs and comprise a liquid crystal panel and a backlight module. The liquid crystal display panel is composed of two transparent substrates and liquid crystal molecules enclosed between the substrates.

A backlight module is a key component widely applied in panel displays, especially liquid crystal displays (LCDs). Generally, backlight module is installed on the backside of panel display of liquid crystal displays. According to the need for providing different functional liquid crystal displays, the backlight module can be classified into either a Direct type or an Edge type.

The thin film transistor liquid crystal display in addition to glass substrates, also requires the backlight module to provide effective display, and in traditional edge type backlight, the light emitting diode chips require to be disposed on the side of the light guide plate. Since the size of the light emitting diode chips is large and the light emitting diode chips require to be integrated into a circuit board, such design is inconvenient for flexible producing.

SUMMARY OF THE INVENTION

In order to solve the above-mentioned problems, it is an object of the present invention to provide a backlight module comprising: a light guide plate having a light incident side; and a plurality of optical fiber bundles disposed at an edge of the light incident side of the light guide plate, wherein each of the optical fiber bundles comprises light-guiding section and light-outputting section, a plurality of light-outputting sections of the plurality of optical fiber bundles arranged at the light incident side of the light guide plate.

In one embodiment of the present invention, a plurality of light-outputting sections of the plurality of optical fiber bundles are arranged in a staggered manner.

In one embodiment of the present invention, each of the optical fiber bundles comprises more than one light-outputting section.

In one embodiment of the present invention, the light-guiding section of the optical fiber bundle comprises an optical fiber inner layer and a first optical fiber outer layer, a refractive index of the optical fiber inner layer is greater than a refractive index of the first optical fiber outer layer.

In one embodiment of the present invention, the light-outputting section of the optical fiber bundle comprises an optical fiber inner layer and a second optical fiber outer layer, a refractive index of the second optical fiber outer layer is greater than a refractive index of the optical fiber inner layer.

In one embodiment of the present invention, a plurality of the optical fiber bundles are distributed in an array to increase a size of a light spot of the plurality of the light-outputting sections.

In one embodiment of the present invention, the backlight module further comprises a light source for providing light for the plurality of optical fiber bundles.

In one embodiment of the present invention, a length ratio of the light-outputting section to the light-guiding section is less than 1.

Another object of the present invention is to provide a backlight module comprising: a light guide plate having a light incident side; a plurality of optical fiber bundles disposed at an edge of the light incident side of the light guide plate, wherein each of the optical fiber bundles comprises a light-guiding section and at least two light-outputting sections; the light-outputting sections of the plurality of optical fiber bundles disposed at the light incident side of the light guide plate. Wherein, the light-outputting sections of the plurality of optical fiber bundles are arranged in a staggered manner, and the plurality of the optical fiber bundles are distributed in an array so as to increase a size of a light spot of the light-outputting sections.

In one embodiment of the present invention, the backlight module further comprises a light source to provide light for the plurality of optical fiber bundles. The light sources may be the ambient light, Cold Cathode Fluorescent Lamp (CCFL), Hot Cathode Fluorescent Lamp (HCFL), Light-Emitting Diode (LED), Organic Light Emitting Diode (OLED), Flat Fluorescent Lamp (FFL), Electro-Luminescence (EL), Electrodeless lamp or the combination thereof.

In one embodiment of the present invention, a shape of the light guide plate may be in rectangular or in cube.

In one embodiment of the present invention, a length ratio of the light-outputting section to the light-guiding section is less than 1.

Another object of the present invention is to provide a display apparatus comprising a display panel and a backlight module, wherein the backlight module comprises a light guide plate having a light incident side, a plurality of optical fiber bundles disposed at an edge of the light incident side of the light guide plate. Each of the optical fiber bundles comprises a light-guiding section and a light-outputting section, a plurality of light-outputting sections of the plurality of optical fiber bundles are arranged at the light incident side of the light guide plate.

The present invention utilizes optical fiber bundles instead of light emitting diodes integrated bars to achieve the flexile design of backlight. Since the optical fiber bundles have the characteristics of being light, thin and flexile, the backlight module using optical fiber bundles as light source will made the structure of light collected system simpler. Furthermore, the light emitting direction of the optical fiber bundles is changed from the end to the border, the borders of the optical fiber bundles can be attached to the edge of the light guide plate so that the backlight module has more efficient ways of utilizing space.

Various other objects, advantages and features of the present invention will become readily apparent from the ensuing detailed description, and the novel features will be particularly pointed out in the appended claims.

BRIEF DESCRIPTION OF FIGURES

The following detailed descriptions, given by way of example, and not intended to limit the present invention solely thereto, will be best be understood in conjunction with the accompanying figures.

DETAILED DESCRIPTION OF THE EMBODIMENTS

Figure 1:
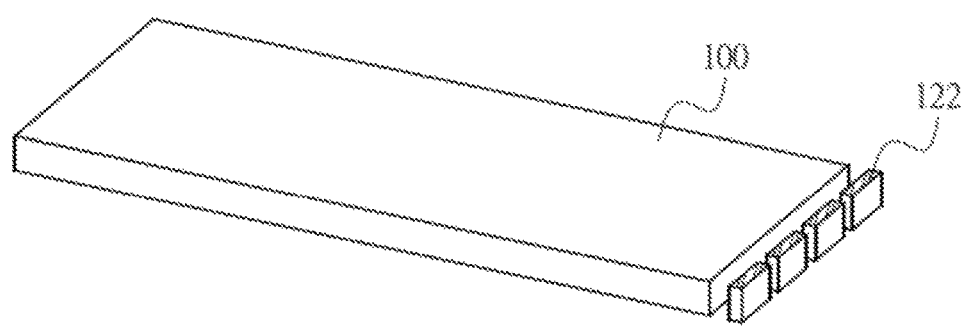
FIG. 1 shows a schematic diagram of an exemplary edge type backlight module.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

Furthermore, in the specification, "on" implies being positioned above or below a target element and does not imply being necessarily positioned on the top on the basis of a gravity direction.

In the present embodiment, a display apparatus comprises a liquid crystal panel and a backlight module that are opposite to each other. The liquid crystal display panel mainly comprises a color filter substrate, a thin film transistor substrate and a liquid crystal molecules layer interposed between two parallel substrates. The color filter substrate and the thin film transistor substrate and the liquid crystal molecules layer can form a plurality of pixel units arranged in an array. Since the liquid crystal panel itself does not emit light, the light must be provided by the backlight module in order to display a color through the pixel unit of the liquid crystal display panel to normally display images. Thus, the backlight module is one of the key components of a display apparatus.

In one embodiment, the liquid crystal display panel of the present invention may be a curved monitor and the display apparatus of the present invention may be the curved display apparatus.

Nowadays, in the wide viewing angle technology of the Vertical Alignment (VA) type liquid crystal display panel, manufacturers of liquid crystal display apparatus have stepped into the use of the photo-alignment techniques to control the alignment of liquid crystal molecules and thereby to improve the optical performance and yield of liquid crystal display panel. The photo-alignment technique forms a multi-domain in each pixel of the panel, therefore to make liquid crystal molecules pre-tilt to, for example, four different directions in one pixel.

Meanwhile, the photo-alignment technique utilizes the ultraviolet light to irradiate a polyimide (referred to as PI) alignment layer disposed on the color filter substrate or on the thin film transistor substrate, to cause the surface polymer structure of the PI alignment layer resulted in non-uniform photopolymerization, isomerization or cracking reaction and to induce the chemical bond structure on the surface of the film to produce a rubbing alignment of the liquid crystal molecules.

According to the alignment methods of the liquid crystal, the liquid crystal display panel can be classified into the following modes: Vertical Alignment (VA), Twisted Nematic (TN), Super Twisted Nematic (STN), In-Plane Switching (IPS), and Fringe Field Switching (FFS). For choosing the Vertical Alignment (VA) mode, the liquid crystal display apparatus may be constructed with Patterned Vertical Alignment (PVA) mode or Multi-domain Vertical Alignment (MVA) mode, wherein the PVA mode using fringe field effect and compensation films to achieve wide viewing angle.

The MVA mode divides a pixel into multi-domain and uses the protrusion or a specific pattern to pre-tilt the liquid crystal molecules in different alignments of each different domains so as to achieve a wide viewing angle and enhance the transmittance. In the IPS mode or the FFS mode, the electrical field is applied through opposite electrodes on the same glass substrate, so that the liquid crystal molecules can be reoriented (switched). Both the IPS mode and the FFS mode have the advantage in wide viewing angle.

The backlight module is one of the key components of a thin film transistor liquid crystal display (TFT-LCD). Since the liquid crystal panel itself does not emit light, the light must be provided by the light source and transmitted to through the light guiding structure, diffusion plate, prism, LCD panel and other related components of TFT-LCD, and finally into the human eye to achieve the display function.

The backlight module has the edge type and the direct type according to the position of the light sources, which edge type has light source disposed at the side of the light guiding structure. However, the light-outputting surface of the light guiding structure where closed to the light source usually accompanied by light leakage.

FIG. 1 shows a schematic diagram of an exemplary edge type backlight module. Referring to FIG. 1, the thin film transistor liquid crystal display in addition to glass substrates, also requires the backlight module to provide effective display, in traditional edge type backlight, the light emitting diode chips require to be disposed on the side of the light guide plate. Since the size of the light emitting diode chips is large and the light emitting diode chips require to be integrated into circuit board, such design is inconvenient for flexible producing.

Figure 2A:
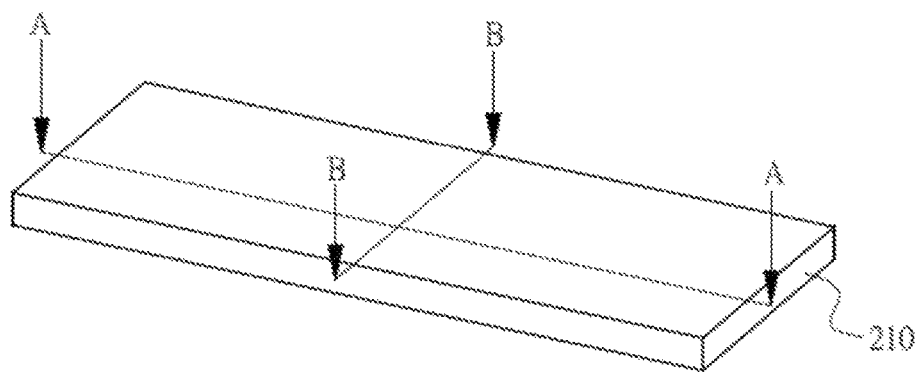
FIG. 2a shows a schematic diagram of an exemplary light guide plate.
Figure 2B:
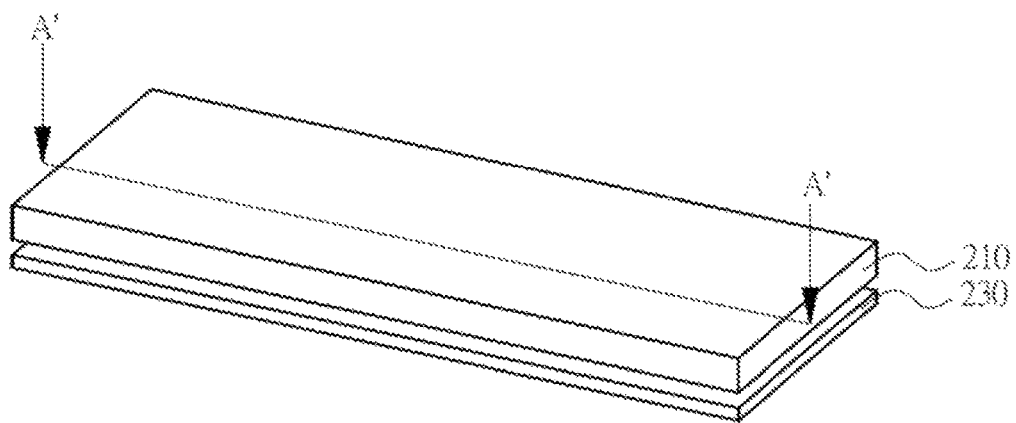
FIG. 2b shows a schematic diagram of another exemplary light guide plate.
Figure 2C:
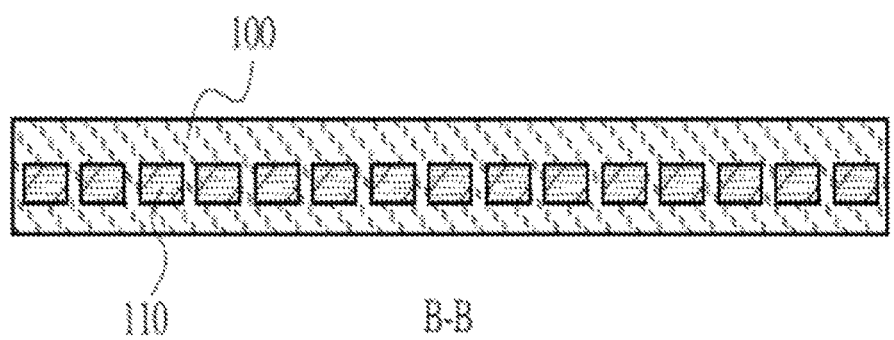
FIG. 2c is a cross-sectional view of the exemplary light guide plate according to BB profile.
Figure 2D:
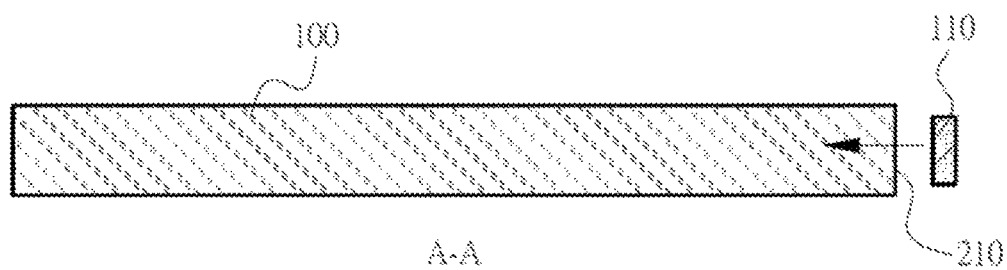
FIG. 2d is a cross-sectional view of the exemplary light guide plate according to AA profile.
Figure 2E:
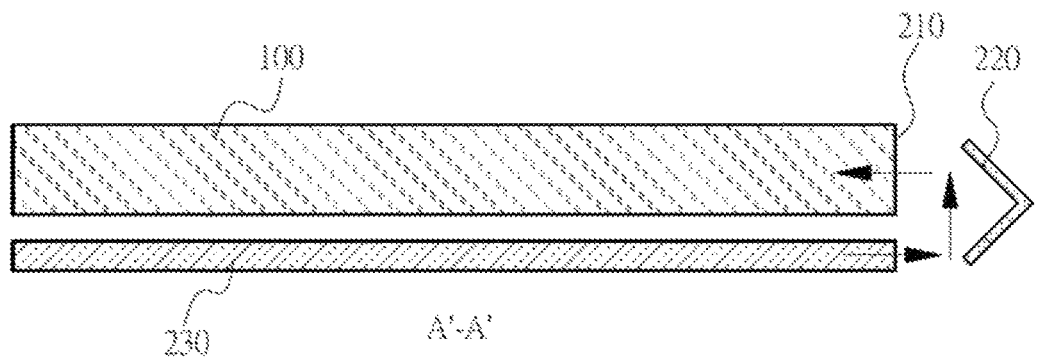
FIG. 2e is a cross-sectional view of another exemplary light guide plate according to A'A' profile.

FIG. 2a shows a schematic diagram of an exemplary light guide plate 100, FIG. 2b shows a schematic diagram of another exemplary light guide plate 100, FIG. 2c is a cross-sectional view of the exemplary light guide plate 100 according to BB profile, FIG. 2d is a cross-sectional view of the exemplary light guide plate 100 according to AA profile and FIG. 2e is a cross-sectional view of the exemplary light guide plate 100 according to A'A' profile. Referring to FIGS. 2a, 2b, 2c, 2d and 2e, providing the exemplary technique to use the optical fiber bundle 230 instead of the light emitting diode (LEDs) 122 and using a light collector 220 to collect light emitted by the optical fiber bundle 230.

Figure 3A:
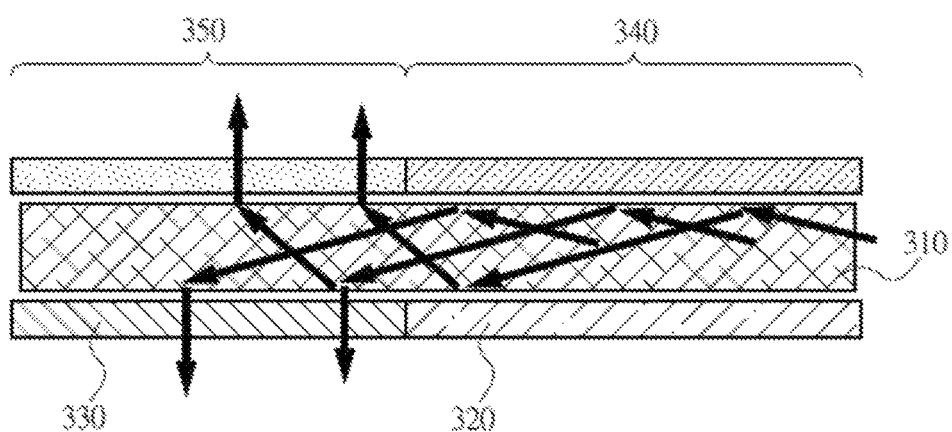
FIG. 3a is a cross-sectional view showing the structure of an optical fiber bundle according to an embodiment of the present disclosure.
Figure 3B:
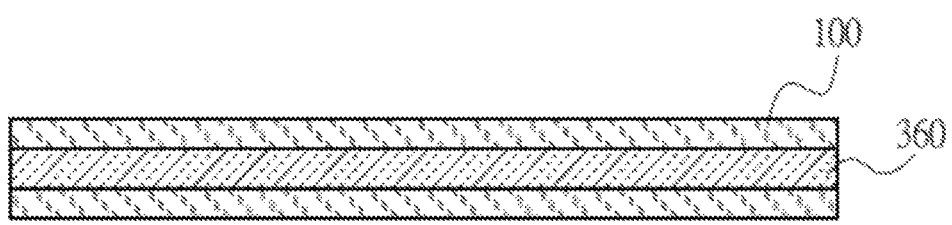
FIG. 3b is a cross-sectional view showing an optical fiber bundle according to an embodiment of the present disclosure.
Figure 3C:
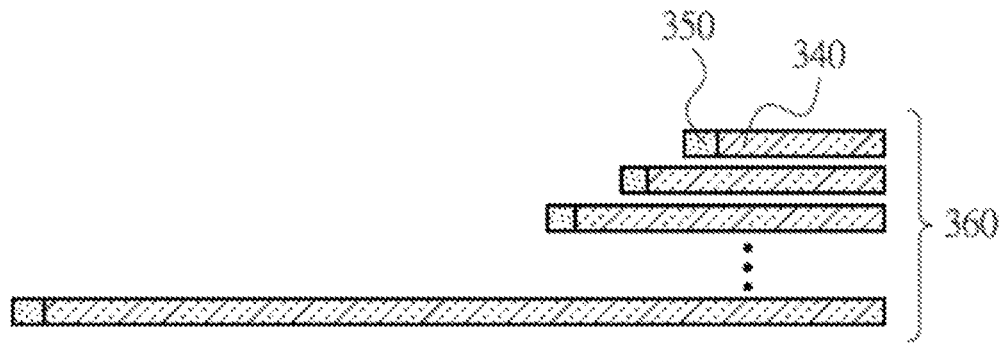
FIG. 3c is a schematic view showing the batch of optical fiber bundle according to an embodiment of the present disclosure.

FIG. 3a is a cross-sectional view showing the structure of an optical fiber bundle according to an embodiment of the present disclosure, FIG. 3b is a cross-sectional view showing the batch of optical fiber bundle 360 according to an embodiment of the present disclosure and FIG. 3c is a schematic view showing the batch of optical fiber bundle 360 according to an embodiment of the present disclosure. Referring to FIGS. 3a, 3b and 3c, in one embodiment of the present disclosure, using the batch of optical fiber bundle 360 to guide the light emitting from light sources into the light incident side of the light guide plate 100, especially the optical fiber bundles output the light through the borders of the optical fiber bundles instead of the ends of the optical fiber bundles.

The optical fiber bundle has two layers with different refractive index and total reflection for the light-guiding section 340. A refractive index of the inner material and a refractive index of the outer material are different and an internal refractive index of the optical fiber bundles is greater than an external refractive index. Since this structure satisfies the total reflection condition, the light is efficiently transmitted.

When the light is transmitted to reach the light-outputting section 350, a refractive index of the external material of the optical fiber bundles changes so that the optical fiber bundles no longer maintain total reflection, and the light is transmitted and enters the light guide plate 100 through the light incident side. According to the principle of refraction $n1 \sin \theta1 = n2 \sin \theta2$ via a change of the material of outer layer of the light-outputting section 350, a refractive index of material 330 is greater than a refractive index of the material 310.

Referring to FIGS. 3a and 3c, in one embodiment of the present disclosure, the optical fiber bundle 360 comprises the light-guiding section 340 and the light-outputting section 350. The light-guiding section 340 of the optical fiber bundle 360 further comprises an optical fiber inner layer 310 and an optical fiber outer layer 320, a refractive index of the optical fiber inner layer 310 is greater than a refractive index of the optical fiber outer layer 320. The light-outputting section 350 of the optical fiber bundle 360 further comprises the optical fiber inner layer 310 and the optical fiber outer layer 330, a refractive index of the optical fiber outer layer 330 is greater than a refractive index of the optical fiber inner layer 310. The length ratio of the light-outputting section to the light-guiding section is less than 1.

Referring to FIGS. 3a and 3c, when light emitted from the light sources and transmitted by the optical fiber bundle 360 to through each interface between layers and different results will produce in each interface.

In the case of the optical fiber inner layer 310 in the light-guiding section 340 of the optical fiber bundle 360, when the light reaches an interface of the optical fiber outer layer 320 and the optical fiber inner layer 310, the light can be easily reflected within the optical fiber inner layer 310 due to a refractive index of the optical fiber inner layer 310 is greater than a refractive index of the optical fiber outer layer 320, therefore the light are less likely to be refracted into the optical fiber outer layer 320.

Similarity, in the case of the optical fiber inner layer 310 in the light-outputting section 350 of the optical fiber bundle 360, when the light reaches an interface of the optical fiber outer layer 330 and the optical fiber inner layer 310, the light can be easily refracted into the optical fiber outer layer 330 due to a refractive index of the optical fiber outer layer 330 is greater than a refractive index of the optical fiber inner layer 310, therefore the light are less likely to be refracted back to the optical fiber inner layer 310.

Figure 4:
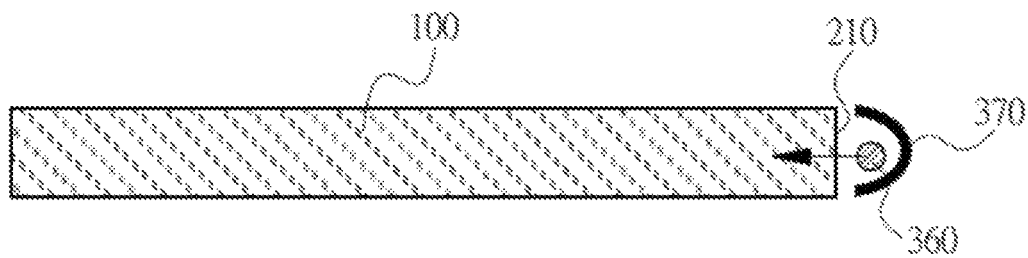
FIG. 4 is a schematic cross-sectional view showing the backlight module with the optical fiber bundle according to an embodiment of the present disclosure.

FIG. 4 is a cross-sectional view showing the light guide plate 100 and the optical fiber bundle 360 according to an embodiment of the present disclosure. Referring to FIG. 4, the backlight module further comprises an optical fiber bundle 360 and at least one light collecting reflector 370 disposed near to the light guide plate 100.

The optical fiber bundle 360 is disposed at an edge of the light guide plate closed to the light incident side and comprises the light-guiding section and the light-outputting section. The light collecting reflector 370 is configured to reflect and guide the light transmitted from the optical fiber bundles 360 into the light incident side 210 of the light guide plate 100.

Figure 5A:
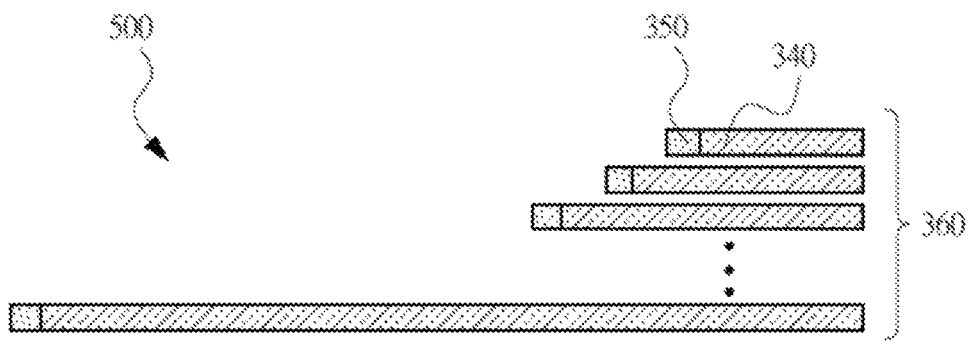
FIG. 5a is a schematic view showing the structure of another batch of optical fiber bundles according to another embodiment of the present invention.
Figure 5B:
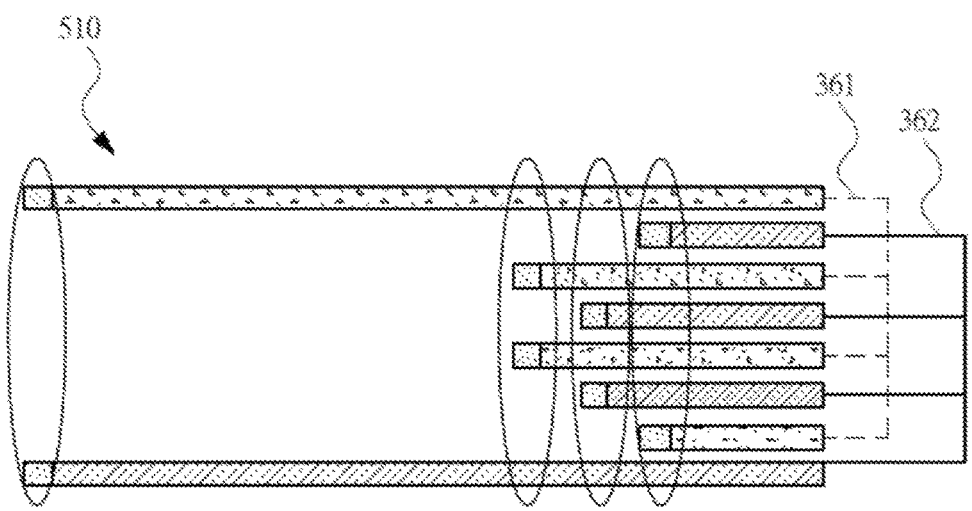
FIG. 5b is a schematic view showing the staggered optical fiber bundles according to one embodiment of the present invention.

FIG. 5a is a schematic view showing the structure of batch of optical fiber bundles 500 in the backlight module according to another embodiment of the present invention and FIG. 5b is a schematic view showing the structure of staggered optical fiber bundles 510 in the backlight module according to one embodiment of the present invention. Referring to FIGS. 5a and 5b, a plurality of sections of the optical fiber bundles evenly covered in the light incident side 210 of the light guide plate 100. Using the optical fiber bundle to transmit the light, when the plurality of the optical fiber bundles 361, 362 are distributed in an array that can increase the light spot size of the light-outputting section so that increasing the light uniformity.

In one embodiment of the present invention, the backlight module further comprises a light source to provide light for the optical fiber bundle. The light sources may be the ambient light, Cold Cathode Fluorescent Lamp (CCFL), Hot Cathode Fluorescent Lamp (HCFL), Light-Emitting Diode (LED), Organic Light Emitting Diode (OLED), Flat Fluorescent Lamp (FFL), Electro-Luminescence (EL), Electrodeless lamp or the combination thereof.

Referring to FIG. 4, in one embodiment of the present invention, the shape of the light guide plate 100 may be the rectangular shape or the cube shape.

Referring to FIGS. 3a, 3c, 4, 5a and 5b, in one embodiment of the present invention, a display apparatus comprises a display panel for displaying the images and the backlight module comprises the light guide plate 100, the optical fiber bundle 360 and the light collecting reflector 370. The optical fiber bundle 360 are disposed at edge of the light incident side of the light guide plate and comprises the light-guiding section and the light-outputting section.

The light collecting reflector 370 are configured to reflect and guide the light transmitted from the optical fiber bundles 360 into the light incident side 210 of the light guide plate 100. A plurality of sections of the optical fiber bundles evenly are covered in the light incident side 210 of the light guide plate 100. Using the optical fiber bundle to transmit the light, when the plurality of the optical fiber bundles 361, 362 are distributed in an array that can increase the light spot size of the light-outputting section so that increasing the light uniformity.

The optical fiber bundle 360 comprises the light-guiding section 340 and the light-outputting section 350. The light-guiding section 340 of the optical fiber bundle 360 further comprises the optical fiber inner layer 310 and the optical fiber outer layer 320, a refractive index of the optical fiber inner layer 310 is greater than a refractive index of the optical fiber outer layer 320. The light-outputting section 350 of the optical fiber bundle 360 further comprises the optical fiber inner layer 310 and the optical fiber outer layer 330, a refractive index of the optical fiber outer layer 330 is greater than a refractive index of the optical fiber inner layer 310. When the light emitted from the light sources and transmitted by the optical fiber bundle 360 to through each interface between the layers and that produced different results in each interface. In the case of the optical fiber inner layer 310 in the light-guiding section 340 of the optical fiber bundle 360, when the light reach the interface of the optical fiber outer layer 320 and the optical fiber inner layer 310, the light can be easily reflected within the optical fiber inner layer 310 due to a refractive index of the optical fiber inner layer 310 is greater than a refractive index of the optical fiber outer layer 320, therefore the light are less likely to be refracted into the optical fiber outer layer 320.

Similarity, in the case of the optical fiber inner layer 310 in the light-outputting section 350 of the optical fiber bundle 360, when the light reach the interface of the optical fiber outer layer 330 and the optical fiber inner layer 310, the light can be easily refracted into the optical fiber outer layer 330 due to a refractive index of the optical fiber outer layer 330 is greater than a refractive index of the optical fiber inner layer 310, therefore the light are less likely to be reflected back to the optical fiber inner layer 310. The length ratio of the light-outputting section to the light-guiding section is less than 1.

Figure 6:
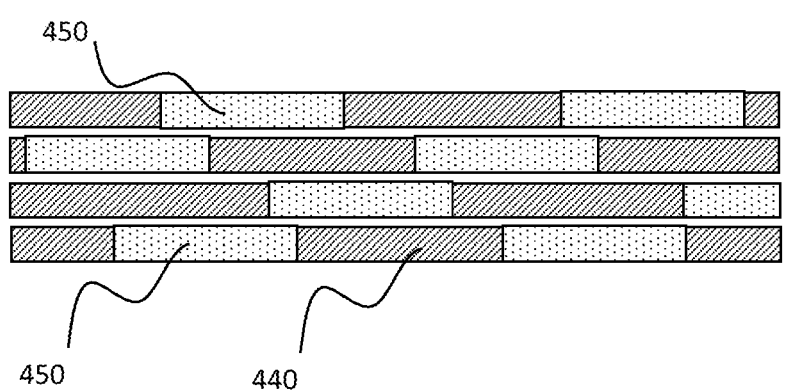
FIG. 6 is a schematic view showing the batch of optical fiber bundles according to one embodiment of the present invention.

FIG. 6 is a schematic view showing the batch of optical fiber bundles according to one embodiment of the present invention. In some embodiments, each optical fiber bundle comprises a light-guiding section 440 and a light-outputting section 450. As shown in FIG. 6, the location of those light-outputting sections 450 can be arranged in a staggered manner to make the light outputting uniform distribution and to avoid concentrated at certain area of the light incident side 210 of the light guide plate 100. Furthermore, each optical fiber bundle may comprise more than one light-outputting section 450 to make the light outputting uniform distribution.

The present disclosure also provides a display apparatus comprising a display panel (not shown) and a backlight module. The display panel is, for example, an LCD panel, which is disposed on the backlight module.

The present invention utilizes the optical fiber bundle instead of light emitting diodes integrated bar to achieve the flexile design of backlight. Since the optical fiber bundle has the characteristics of being light, thin and flexile, the backlight module using optical fiber bundle as light source will made the structure of light collected system simpler. Furthermore, the light emitting direction of optical fiber bundles is changed from the end to the border, the borders of the optical fiber bundles can be attached to the edge of the light guide plate so that the backlight module has more efficient ways of utilizing space.

In other embodiments, the light guide plate 100 may be made by the method of injection molding, and the material thereof may be photo-curable resin, polymethylmethacrylate (PMMA) or polycarbonate (PC) for guiding the light toward the liquid crystal display panel.

The light guide plate may comprise the light-outputting surface, reflective surface and side-incident surface, wherein the light-outputting surface faced the liquid crystal display panel and may have the matte treatment or the scattering point design to has better uniformity and to reduce the Mura phenomenon.

In another embodiment, the light-outputting surface may include a plurality of protruding structures (not shown) to vary the light, thereby condensing the light and enhancing a brightness thereof, wherein the protruding structures may be prism-shaped structures or semicircle-shaped structures.

The reflective surface is formed opposite to the light-outputting surface for reflecting light thereto. In the present embodiment, the reflective surface of the light guide plate is parallel to the light-outputting surface. The reflective surface may have a plurality of light guiding structures (not shown) formed thereon to guide light transmitted through the light-outputting surface. The light guiding structures of the reflective surface may be a continuous V-shaped structure, i.e. V-cut structures, a cloudy surface or scattering patterns, thereby guiding the light transmitted through the light-outputting surface. The side-incident surface may be formed on one side or two opposite sides of the light guide plate and facing the light-outputting section of the optical fiber bundle for allowing the light to be transmitted into the light guide plate. The side-incident surface may have V-shaped structures (V-cut structures), S-shaped structures or a rough surface structure (not shown) to raise light incidence efficiency and light coupling efficiency.

In another embodiment, the reflective surface of the light guide plate in the backlight module of the present disclosure may be made of a highly reflective material, such as Ag, Al, Au, Cr, Cu, In, Ir, Ni, Pt, Re, Rh, Sn, Ta, W, Mn, any combination of alloys thereof, a white reflective paint with etiolation-resistant and heat-resistant properties or any combination thereof for reflecting light.

In another embodiment, the backlight module of the present disclosure may further comprise the optical film. The optical film may be a diffuser, a prism sheet, a turning prism sheet, a brightness enhancement film (BEF), a dual brightness enhancement film (DBEF), a diffused reflective polarizer film (DRPF) or any combination thereof disposed above the light guide plate for improving an optical effect of light outputted from the light guide plate.

In addition, in the specification, unless explicitly described to the contrary, the word "comprise" and variations such as "comprises" or "comprising" will be understood to imply the inclusion of stated elements but not the exclusion of any other elements.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A backlight module, comprising:
a light guide plate, having a light incident side; and
a plurality of optical fiber bundles, disposed at an edge of the light incident side of the light guide plate;
wherein each of the optical fiber bundles comprises a light-guiding section and a light-outputting section, a plurality of the light-outputting sections of the plurality of optical fiber bundles arranged at the light incident side of the light guide plate,
wherein the light-guiding section and the light-outputting section on the same surface,
wherein each of the optical fiber bundles comprises a plurality of light-outputting section,
wherein the plurality of the light-outputting sections of the plurality of the optical fiber bundles are staggered,
wherein the light-guiding section of the optical fiber bundle comprises an optical fiber inner layer and a first optical fiber outer layer, a refractive index of the optical fiber inner layer is greater than a refractive index of the first optical fiber outer layer,
wherein the light-outputting section of the optical fiber bundle comprises the optical fiber inner layer and a second optical fiber outer layer, a refractive index of the second optical fiber outer layer is greater than the refractive index of the optical fiber inner layer,
wherein a ratio of a length of the light-outputting section to the light-guiding section is less than 1.

2. The backlight module according to claim 1, wherein the plurality of the optical fiber bundles are distributed in an array so as to increase a size of a light spot of the plurality of the light-outputting sections.

3. The backlight module according to claim 1, further comprising a light source for providing light for the plurality of optical fiber bundles.

4. A backlight module, comprising:
a light guide plate, having a light incident side;
a plurality of optical fiber bundles, disposed at an edge of the light incident side of the light guide plate, each of the optical fiber bundles comprising a light-guiding section and at least two light-outputting sections, the light-outputting sections of the plurality of optical fiber bundles being arranged at the light incident side of the light guide plate; and
a light collecting reflector, configured for reflecting and guiding light transmitted from the plurality of the optical fiber bundles into the light incident side of the light guide plate;
wherein the plurality of the optical fiber bundles are distributed in an array so as to increase a size of a light spot of the plurality of the light-outputting sections, and a ratio of a length of the light-outputting section to the light-guiding section is less than 1,
wherein the light-guiding section and the light-outputting section on the same surface,
wherein the plurality of the light-outputting sections of the plurality of the optical fiber bundles are staggered,
wherein the light-guiding section of the optical fiber bundle comprises an optical fiber inner layer and a first optical fiber outer layer, a refractive index of the optical fiber inner layer is greater than a refractive index of the first optical fiber outer layer,
wherein the light-outputting section of the optical fiber bundle comprises the optical fiber inner layer and a second optical fiber outer layer, a refractive index of the second optical fiber outer layer is greater than the refractive index of the optical fiber inner layer.

5. A display apparatus comprising a display panel and a backlight module, the backlight module comprising:
a light guide plate, having a light incident side; and
a plurality of optical fiber bundles, disposed at an edge of the light incident side of the light guide plate;
wherein each of the optical fiber bundles comprises a light-guiding section and a light-outputting section, a plurality of light-outputting sections of the plurality of optical fiber bundles arranged at the light incident side of the light guide plate,
wherein the light-guiding section and the light-outputting section on the same surface,
wherein each of the optical fiber bundles comprises a plurality of light-outputting section,
wherein the plurality of the light-outputting sections of the plurality of the optical fiber bundles are staggered,
wherein the light-guiding section of the optical fiber bundle comprises an optical fiber inner layer and a first optical fiber outer layer, a refractive index of the optical fiber inner layer is greater than a refractive index of the first optical fiber outer layer,
wherein the light-outputting section of the optical fiber bundle comprises the optical fiber inner layer and a second optical fiber outer layer, a refractive index of the second optical fiber outer layer is greater than the refractive index of the optical fiber inner layer,
wherein a ratio of a length of the light-outputting section to the light-guiding section is less than 1.

6. The display apparatus according to claim 5, wherein the plurality of the optical fiber bundles are distributed in an array so as to increase a size of a light spot of plurality of the light-outputting sections.

7. The display apparatus according to claim 5, wherein the backlight module further comprising a light source for providing light for the plurality of optical fiber bundles.

* * * * *